(12) United States Patent
Huang (10) Patent No.: US 12,478,945 B2
(45) Date of Patent: Nov. 25, 2025

(54) NOXIOUS GAS PURIFICANT AND ITS PREPARATION AND PURIFICATION METHOD THEREOF

(71) Applicant: Liwei Huang, Hangzhou (CN)

(72) Inventor: Liwei Huang, Hangzhou (CN)

( * ) Notice: Subject to any disclaimer, the term of this patent is extended or adjusted under 35 U.S.C. 154(b) by 25 days.

(21) Appl. No.: 18/332,712

(22) Filed: Jun. 10, 2023

(65) Prior Publication Data

US 2024/0001332 A1 Jan. 4, 2024

Related U.S. Application Data

(63) Continuation of application No. 16/336,099, filed as application No. PCT/CN2017/106121 on Oct. 13, 2017, now Pat. No. 11,911,740.

(30) Foreign Application Priority Data

Oct. 14, 2016 (CN) .......................... 201610901763.2
Oct. 14, 2016 (CN) .......................... 201610901765.1
(Continued)

(51) Int. Cl.
*B01J 20/04* (2006.01)
*B01D 53/56* (2006.01)
(Continued)

(52) U.S. Cl.
CPC .......... *B01J 20/045* (2013.01); *B01D 53/565* (2013.01); *B01D 53/81* (2013.01); *B01D 53/96* (2013.01);
(Continued)

(58) Field of Classification Search
None
See application file for complete search history.

(56) References Cited

U.S. PATENT DOCUMENTS 3,382,033 A * 5/1968 Kitagawa ................ B42F 21/10
423/239.1
3,860,690 A * 1/1975 Gidaspow .............. B01D 53/56
423/239.1
(Continued)

FOREIGN PATENT DOCUMENTS

CN 1426837 7/2003
CN 101298017 11/2008
(Continued)

OTHER PUBLICATIONS

International Search Report and Written Opinion for International Patent Application No. PCT/CN2017/106121 dated Jan. 12, 2018.

*Primary Examiner* — Michael Forrest (57) ABSTRACT

The invention relates to a noxious gas purificant and its preparation and purification method for removing nitrogen oxides from gas streams thereof. The preparing method is characterized in that: mixing, according to a predetermined ratio and a process, a salt of iron, manganese, cobalt, or copper, and a related derivative thereof, an alkali or alkaline substance and a related derivative thereof, water and a forming agent, so as to obtain a solid compound or mixture; drying and activating the solid compound or mixture to produce a solid product as the purificant; and introducing the purificant into a gas-solid reactor, and removing noxious gases in a gas stream by performing, in a preconfigured temperature and using the purificant, a gas-solid reaction on the harmful gases in the gas stream. The purificant can be recycled and reused.

9 Claims, 2 Drawing Sheets

(30) Foreign Application Priority Data

| Oct. 17, 2016 | (CN) | 201610906056.2 |
| Oct. 17, 2016 | (CN) | 201610906058.1 |
| Oct. 20, 2016 | (CN) | 201610922408.3 |
| Oct. 24, 2016 | (CN) | 201610939180.9 |
| Jan. 1, 2017 | (CN) | 201710019937.7 |
| Feb. 2, 2017 | (CN) | 201710068265.9 |

(51) Int. Cl.
 *B01D 53/81* (2006.01)
 *B01D 53/96* (2006.01)
 *B01J 20/28* (2006.01)
 *B01J 20/30* (2006.01)
 *B01J 20/34* (2006.01)

(52) U.S. Cl.
 CPC ... *B01J 20/28016* (2013.01); *B01J 20/28045* (2013.01); *B01J 20/3078* (2013.01); *B01J 20/3433* (2013.01); *B01J 20/3458* (2013.01); *B01D 2253/112* (2013.01); *B01D 2257/404* (2013.01)

(56) References Cited

U.S. PATENT DOCUMENTS

| 4,323,544 | A | * | 4/1982 | Magder | B01J 20/3458 |
| | | | | | 502/55 |
| 4,721,582 | A | * | 1/1988 | Nelson | B01J 20/3078 |
| | | | | | 252/189 |
| 4,755,499 | A | * | 7/1988 | Neal | B01J 53/12 |
| | | | | | 502/414 |
| 4,977,123 | A | | 12/1990 | Flytzani-Stephanopoulos et al. |
| 6,066,590 | A | | 5/2000 | Horii et al. |
| 6,068,824 | A | * | 5/2000 | Kinoshita | B01D 53/8628 |
| | | | | | 423/239.1 |
| 2008/0047395 | A1 | | 2/2008 | Liu et al. |
| 2010/0055012 | A1 | | 3/2010 | Grisstede et al. |

FOREIGN PATENT DOCUMENTS

| CN | 103736371 | 4/2014 |
| CN | 105771617 | 7/2016 |
| CN | 106268219 | 1/2017 |

* cited by examiner

NOXIOUS GAS PURIFICANT AND ITS PREPARATION AND PURIFICATION METHOD THEREOF

CROSS-REFERENCE TO RELATED APPLICATION

This application claims priority to PCT Application No. PCT/CN2017/106121 having a filing date of Oct. 13, 2017, based off of CN applications numbered 201610901765.1, 201610901763.2, 201610906056.2, 201610906058.1, 201610922408.3, 201610939180.9, 201710019937.7 and 201710068265.9, having a filing date of Oct. 14, 2016, Oct. 14, 2016, Oct. 17, 2016, Oct. 17, 2016, Oct. 20 2016, Oct. 24, 2016, Jan. 1, 2017 and Feb. 2, 2017, respectively, the entire contents of which are hereby incorporated by reference.

FIELD OF TECHNOLOGY

This invention relates to a noxious gas purificant and its preparation and purification method thereof, in particular to remove nitrogen oxides in a gas stream, and belongs to the technical field of air pollution control and related environmental protections.

BACKGROUND OF THE INVENTION

Human activities produce noxious gases such as nitrogen oxides ($NO_x$, including NO and $NO_2$) and sulfur dioxide ($SO_2$), most of which are produced by fossil fuel combustion, followed by nitric acid manufacturing, nitrification of chemical and pharmaceutical industries, metal surface and semiconductor treatment processes. Nitrogen oxides and sulfur dioxide are toxic to human beings and large amount emissions of these pollutants are one of the main causes of atmospheric photochemical fogs and acid rains. Statistics show that the contribution of nitrogen oxides in urban acid rain has been increasing continuously in China. Therefore much more stringent laws and regulations have been enacted on the emissions of nitrogen oxides and sulfur dioxide, especially for the emissions from thermal power plant and other fossil combustion processes.

Generally, the concentration of nitrogen oxides in exhaust gases from fossil fuel combustion, such as thermal power plants, is from about several hundreds to several thousands parts per million (ppm), of which more than 90% is nitric oxide (NO). At present, selective catalytic reduction (SCR) is one of the major methods to remove $NO_x$ from flue gases. But the catalyst works at a strict operating condition, and ammonia or urea is needed as the reductive agent. When the flue gases contain sulfides and dusts, the catalyst may be degraded after a period of operation, and the operation cost will be higher for coal-fueled thermal power plants. Wet method using a variety of liquids to absorb $NO_x$ from gas stream is the major treatment for emission at low temperature. However, when the flue gas contains much more nitric oxide, due to its low solubility in water solution, the removal efficiency is low, and the operating costs are also high due to the consumption of expensive reducing agents or oxidants.

Harmful substances such as nitrogen oxides are also emitted from exhaust gases of vehicles and ships using internal combustion engines as power sources, which is the main source of atmospheric photochemical smog in urban area. With the increasing amount of vehicle retention, the air pollution problem becomes more and more serious. In particular, the treatment of the pollutants such as nitrogen oxides emitted from exhaust gas using diesel internal combustion engines is difficult and costly. At present, most of the treatment technologies are concentrated on the catalytic reduction of nitrogen oxides. Therefore, the development of new purification technologies for the control of nitrogen oxides discharged form flue gases or exhaust gases is urgently needed.

Solid adsorbents can be used to adsorb and remove nitrogen oxides in the gas stream, and the sorbent can be recycled after desorption and regeneration. China patent ZL 921028954 disclosed an alumina adsorbent and its preparation method thereof for adsorbing sulfur dioxide and nitrogen oxides in exhaust gas at low temperature, whose active ingredients are alkali or alkaline earth metal, and silica is as the stabilizer. China patent publication No. CN 101326004A disclosed a normal temperature $NO_x$ sorbent which is composed of a carrier containing an oxide of Co, Fe, Cu, Ce, or Mn and a metal catalyst containing Co, Cu, Ag, or Pd. U.S. Pat. No. 5,362,463 disclosed a sorbent which has a main component of a mixture of manganese oxide and aluminum oxide and loaded with potassium carbonate. However, the preparation of the above adsorbent is complicated, and most of them need to be obtained by filtration, drying and roasting after liquid phase preparation, and the regeneration of the sorbent is difficult after deactivation.

An object of the present invention is to provide a noxious gas purificant, its preparation and purification method thereof, which are used to remove nitrogen oxides from gas streams.

SUMMARY OF THE INVENTION

The principal technical problem to be solved by the present invention is to provide a noxious gas purificant (hereinafter referred to as purificant) and a preparation method thereof for the removal of nitrogen oxides from gas streams, which has the characteristics of high activity, convenient preparation and high removal efficiency. Another technical problem to be solved by the present invention is to provide a purification method and apparatus for said purificant, which has the characteristics of simple operation, high processing efficiency, large processing gas volume, and low running cost.

The composition of said purificant includes one or any two or more of component L: iron, cobalt, manganese and copper, one or any two or more of component H: sodium, potassium, lithium, calcium, barium and magnesium, one or two or more of component Q: sulfate, chloride and carbonate radical, one or two of component D: hydroxyl and water, and E component of oxygen (which does not include oxygen in sulfate radical, carbonate radical, hydroxyl, and water), wherein the mass percentage of each component in the purificant is component L from 4 to 96%, component H from 1 to 75%, component Q from 1 to 75%, component D from 1 to 75%, and component E from 0 to 35%. Among them, the iron or cobalt or manganese or copper element and their hydroxyl compounds or oxides or corresponding complex compounds in the purificant play a major role for the removal of nitrogen oxides, and sodium, potassium and lithium in the purificant play a catalytic role. Calcium, barium and magnesium and their oxides or hydroxyl compounds or related salts play the role as adsorbing assistants and forming agents. Said oxygen of component E includes the oxygen both in metal oxides and oxy compounds.

The purificant is mainly composed of component A: iron, one or any two or more of component B: sodium, potassium and lithium, component C: sulfate radical, one or two of component D: hydroxyl and water, component E: oxygen (excluding oxygen in sulfate, hydroxyl, and water), wherein the mass percentage of each component in the purificant is component A from 10 to 96%, component B from 1 to 60%, component C from 1 to 75%, component D from 1 to 40%, and component E from 0.5 to 35%.

The purificant is mainly composed of component A: iron, one or any two or more of component B: sodium, potassium and lithium, one or any two or more of component F: calcium, magnesium and barium, component C: sulfate, one or two of component D: hydroxyl and water, component E: oxygen (excluding oxygen in sulfate radical and hydroxyl), wherein the mass percentage of each component is component A from 10 to 96%, component B from 1 to 60%, component F from 1 to 75%, component C from 1 to 75%, component D from 1 to 40%, component E from 0.5 to 35%.

The purificant is mainly composed of component A: iron, one or any two or more of component F: calcium, magnesium and barium, component C: sulfate, one or two of component D: hydroxyl and water, component E: oxygen (excluding oxygen in radical and hydroxyl), wherein the mass percentage of each component is component A from 5 to 96%, component F from 1 to 75%, component C from 1 to 75%, component D from 1 to 40% and component E: from 0 to 35%.

The purificant is mainly composed of component A: iron, one or any two or more of component F: calcium, magnesium and barium, component G: chlorine, one or two of component D: hydroxyl and water, and component E: oxygen (excluding oxygen in the hydroxyl), wherein the mass percentage of each component is component A from 5 to 96%, component F from 1 to 75%, component G from 1 to 75%, component D from 1 to 40%, and component E from 0 to 35%.

The purificant is mainly composed of component A: iron, one or any two or more of component B: sodium, potassium and lithium, one or any two or more of component F: calcium, magnesium and barium, component G: chlorine, one or two of component D: hydroxyl and water, and component E: oxygen (excluding oxygen in the hydroxyl group), wherein the mass percentage of each component is component A: from 5 to 96%, component B from 1 to 60%, component F from 1 to 75%, component G from 1 to 75%, component D from 1 to 40%, and component E from 0 to 35%.

The purificants is mainly composed of component A: iron, one or any two or more of component H: sodium, potassium, lithium, calcium, barium and magnesium, component G: chlorine, one or two of component D: hydroxyl and water, wherein the mass percentage of each component is component A from 5 to 96%, component H from 1 to 75%, component G from 1 to 60%, and component D from 1 to 50%.

The purificant is mainly composed of component A: iron, one or any two or more of component H: sodium, potassium, lithium, calcium, barium and magnesium, component M: carbonate radical, one or two of component D: hydroxyl and water, and component E: oxygen (excluding oxygen in carbonate radical, hydroxyl and water), wherein the mass percentage of each component is component A from 4 to 96%, component H from 1 to 75%, component M from 1 to 75%, component D from 1 to 75%, and component E of 0 from 0.1 to 35%.

The purificant is mainly composed of component A: iron, one or any two or more of component H: sodium, potassium, lithium, calcium, barium and magnesium, component M: carbonate radical, one or two of component D: hydroxyl and water, wherein the mass percentage of each component is component A from 4 to 96%, component H from 1 to 75, component M from 1 to 75%, and component D from 1 to 75%.

The purificant is mainly composed of one or any two or more of component P: cobalt, manganese and copper, one or any two or more of component H: sodium, potassium, lithium, calcium, barium and magnesium, one or any two or more of component Q: sulfate, chlorine and carbonate, one or two of component D: hydroxyl and water, and component E: oxygen (excluding oxygen in sulfate, carbonate, hydroxyl, and water), wherein the mass percentage of each component is component P from 4 to 96%, and component H from 1 to 75%, component Q from 1 to 75%, component D from 1 to 75%, component E from 0.1 to 35%.

The purificant is mainly composed of one or any two or more of component P: cobalt, manganese and copper, one or any two or more of component H: sodium, potassium, lithium, calcium, barium and magnesium, one or any two or more of component Q: sulfate, chlorine and carbonate; one or two of component D: hydroxyl and water, wherein the mass percentage of each component is component P from 4 to 96%, component H from 1 to 75%, component Q from 1 to 75%, and component D from 1 to 75%.

The purificant is mainly composed of component A: iron, one or any two or more of component P: cobalt, manganese and copper, one or any two or more of component H: sodium, potassium, lithium, calcium, barium and magnesium, one or any two or more of component Q: sulfate, chlorine and carbonate radical, one or two of component D: hydroxyl and water, and component E: oxygen (excluding oxygen in sulfate, carbonate, hydroxyl and water), wherein the mass percentage of each component is component A and P from 4 to 96%, component H from 1 to 75%, component Q from 1 to 75%, component D from 1 to 75%, component E from 0.1 to 35%.

The purificant is mainly composed of component A: iron, one or any two or more of component P: cobalt, manganese and copper, one or any two or more of component H: sodium, potassium, lithium, calcium, barium and magnesium, one or any two or more of component Q: sulfate, chlorine and carbonate radical, and one or two of component D: hydroxyl and water, wherein the mass percentage of each component is component A and P from 4 to 96%, component H from 1 to 75%, component Q from 1 to 75% and component D from 1 to 75%.

Above said purificant is a solid compound or a mixed solid compound.

A preparation method of said purificant is to mix material U, material V and water (If said material U or V is a hydrate, no water or less water is needed, the same below) in a mixing reactor at a certain ratio, and during the mixing process, chemical reactions happen among the materials U, V and water (the temperature of materials may be heated to a certain degree to accelerate the reaction). Generally, the above mixing reaction is an exothermic process, so that the temperature of the reactor may have a certain degree rise. After the mixing reaction, the obtained product will be dried or dried and activated further, and the final obtained solid product is the purificant of present invention. Among the materials for making the purificant, said material U is one or any two or more of the salts of sulfate, chloride and carbonate of component L: ferrous (II) or iron (III), cobalt (II), manganese (II), copper (I) or copper (II), or one or any two or more of basic salts, acid salts, complex salts, polymeric compounds, coordination compounds and related compounds of said salts, which includes ammonium ferrous sulfate, ammonium ferrous chloride, basic ferric sulfate, basic ferric chloride, oxy basic ferric sulfate, ammonium ferric sulfate, cuprous sulfate, cuprous chloride, basic cupric sulfate, basic copper chloride, copper ammonium sulfate, copper ammonium chloride, basic manganese sulfate, basic manganese chloride, ammonium manganese sulfate, ammonium manganese chloride, basic cobalt sulfate, basic cobalt chloride, ammonium cobalt sulfate, ammonium cobalt chloride, polyferric aluminum sulfate, polyaluminum ferric chloride, potassium iron sulfate, ferrous hydrogencarbonate and tetraammine copper sulfate. Material V is one or any two or more of the hydroxides and carbonates of the component B, the oxides, hydroxides and carbonates of the component F, and related acid salts, basic salts and complex salts, which includes sodium hydroxide, potassium hydroxide, lithium hydroxide, calcium oxide, barium oxide, magnesium oxide, calcium hydroxide, barium hydroxide, magnesium hydroxide, sodium carbonate, sodium hydrogencarbonate, potassium carbonate, potassium hydrogencarbonate, Lithium carbonate, lithium hydrogencarbonate, calcium carbonate, calcium hydrogencarbonate, basic calcium carbonate, barium carbonate, barium hydrogencarbonate, magnesium carbonate, magnesium hydrogen carbonate, basic magnesium carbonate, ammonium acid carbonate and aluminum magnesium carbonate. The carbonates of the component B or the component F is less effective than other carbonates such as sodium carbonate and potassium carbonate which are water-soluble and strongly alkaline.

A preparation method of said purificant comprises the following methods of (a) to (i).

(a) The material of ferrous sulfate, one or any two or more of the hydroxides of said component B, and water are mixed at a certain ratio in a mixing reactor. After the mixing reaction, the product is dried or dried and activated sequentially, and the final obtained solid product is said purificant; or said purificant is obtained by mixing ferrous hydroxide, one or any two or more of the sulfates of component B, and water according to above same procedures.

(b) The material of ferrous sulfate, one or any two or more of the hydroxides of said component B, and water are mixed at a certain ratio in a mixing reactor. After the mixing reaction, the product is then mixed with one or any two or more of the oxides and hydroxides of component F, and then is dried or dried and activated sequentially, and the final obtained solid product is said purificant; or said purificant is obtained by mixing ferrous sulfate, one or any two or more hydroxides of said component B, one or any two or more oxides or hydroxides of component F, and water according to above same procedures; or said purificant is obtained by mixing ferrous hydroxide, one or any two or more of the sulfates of component B, one or any two or more of the oxides or hydroxides of component F, and water according to above same procedures.

(c) The material of ferrous sulfate, one or any two or more of the oxides and hydroxides of said component F, and water are mixed in a mixing reactor at a certain ratio. After the mixing reaction, the product is dried or dried and activated sequentially, and the final obtained solid product is said purificant; or the said purificant is obtained by mixing ferrous hydroxide, one or any two or more of the sulfates of component F, and water according to above same procedures.

(d) The material of ferrous chloride, one or any two or more of oxides and hydroxides of said component F, and water are mixed at a certain ratio in a mixing reactor. After the mixing reaction, the product is dried or dried and activated sequentially, and the final obtained solid product is said purificant; or the said purificant is obtained by mixing ferrous hydroxide, one or any two or more of the sulfates of component F, and water according to above same procedures.

(e) The material of ferrous chloride, one or any two or more of the hydroxides of said component B, and water are mixed in a mixing reactor at a certain ratio. After the mixing reaction, the product is then mixed with one or any two or more of the oxides and hydroxides of component F, and then is dried or dried and activated sequentially, and the final obtained solid product is said purificant; or said purificant is obtained by mixing ferrous chloride, one or any two or more of the hydroxides of said component B, one or any two or more of the oxides or hydroxides of component F, and water according to above same procedures; or said purificant is obtained by mixing ferrous hydroxide, one or any two or more of the chlorides of component B, one or any two or more of the oxides or hydroxides of component F, and water according to above same procedures.

(f) The material of ferric chloride, one or any two or more of the hydroxides of said component B, and water are mixed at a certain ratio in a mixing reactor. After the mixing reaction, the product is dried or dried and activated sequentially, and the final obtained solid product is said purificant; or said purificant is obtained by mixing ferric chloride, one or any two or more of the oxides and hydroxides of component F, and water according to above same procedures; or said purificant is obtained by mixing ferric chloride, one or any two or more of the hydroxides of component B, one or any two or more of the oxides and hydroxides of component F, and water according to above same procedures.

(g) The material of ferrous carbonate, one or any two or more of the hydroxides of said component B, and water are mixed at a certain ratio in a mixing reactor. After the mixing reaction, the product is dried or dried and activated sequentially, and the final obtained solid product is said purificant; or said purificant is obtained by mixing ferrous carbonate, one or any two or more of the oxides and hydroxides of component F, and water according to the same procedures; or said purificant is obtained by mixing ferrous carbonate, one or any two or more of the hydroxides of said component B, one or any two or more of the oxides or hydroxides of component F, and water according to above same procedures.

(h) Material W, material Y, and water are mixed at a certain ratio in a mixing reactor. After the mixing reaction, the product is dried or dried and activated sequentially, and the final obtained solid product is said purificant. Said material W is one or any two or more of the salts of sulfate, chloride and carbonate of component P, and said material Y is one or any two or more of the hydroxides of said component B; or said purificant is obtained by mixing the material W, the material F, and water according to above same procedures, wherein material F is one or any two or more of oxides and hydroxides and carbonates of component F; or said purificant is obtained by mixing the material W, the material Y, the material F, and water according to above same procedures.

(i) Or the purificant is obtained by mixing material X, the material W, the material Y and water according to above same procedures, wherein said material X is one or any two or more of the sulfates, chlorides and carbonates of the component A of iron; or said purificant is obtained by mixing the material X, the material W, the material F, and water according to above same procedures; or said purificant is obtained by mixing the material X, the material W, the material Y, the material F, and water according to above same procedures.

A preparation method of said purificant is to mix one or any two or more of the hydroxides and complex compounds of component L, one or any two or more of the sulfates and chlorides and carbonate and corresponding basic and acid salts and complex salts of component H, and water in a mixing reactor at a certain ratio, wherein said hydroxides and complex compounds include ferrous hydroxide, iron hydroxide, manganese (II) hydroxide, cobalt (II) hydroxide, copper hydroxide, cuprous hydroxide, cupricpper tetramminohydroxide and cobalt tetramminohydroxide; said basic and acid salts and complex salts include sodium hydrogen sulfate, potassium hydrogen sulfate, lithium hydrogen sulfate, calcium hydrogen sulfate, barium hydrogen sulfate, magnesium hydrogen sulfate, sodium hydrogencarbonate, potassium hydrogencarbonate, lithium hydrogencarbonate, calcium hydrogencarbonate, barium hydrogencarbonate, Magnesium bicarbonate, basic calcium carbonate, basic magnesium carbonate, aluminum magnesium carbonate, potassium aluminum sulfate and potassium iron sulfate; said hydroxides may also replaced by corresponding carbonates, basic carbonates, basic sulfates and basic chloride, which includes ferrous carbonate, iron carbonate, manganese carbonate, basic cobalt acid, copper carbonate, basic copper carbonate, basic aluminum magnesium carbonate, basic ferric sulfate, polyferric chloride, oxy basic ferric sulfate, basic copper sulfate, basic copper chloride, basic manganese sulfate, basic manganese chloride, basic cobalt sulfate, basic cobalt chloride, polymeric aluminum sulfate and polymeric aluminum-ferric chloride. After the mixing reaction, the mixture is dried or dried and activated sequentially, and the final obtained solid product is said purificant.

In the preparation of said purificant, the stoichiometric reaction mole ratio of the sulfates, chlorides and carbonates of components A and P to the hydroxides of component B, and/or oxides, hydroxide and carbonate of component F is about from 1:0.5 to 1:3, depending on the metal valence in the compound. There is no special requirement of the mole ratio in practical use, which is generally greater than the ratio of 1:0.1, and the preferable value is between 1:0.3 and 1:10, and an appropriate excess of sulfates, chlorides and carbonates of the component A and P is preferred.

When the substitute materials of sulfates, chloride and carbonate of component A and P, the substitute materials of the hydroxides of component B, and the substitute materials of the oxides, hydroxides and carbonates of component F are adopt, the mole ratio of the amount of each material can be referred to above dosage ratio. When the materials of the salts of said component A and P are acid salts, the dosage of the basic substances of component B or F may be increased appropriately, or it may use in combination with other alkaline materials, and vice versa.

In the preparation of the purificant according to the present invention, the same type of materials may be used in combination, and the effect of the obtained product is substantially equivalent. The main objective of adding water in the purificant preparation is to enable the materials wet and mixing and reacting thoroughly. There is no special requirement for the amount of water addition, and generally from 1 to 20 times of the total amount of the materials (molar ratio), preferably from 3 to 10 times. With the increase of water addition, the drying process may consume more energy, and when the material are hydrates, no water or a small amount of water may be needed.

The drying process of said purificant may adopt by heating, and the temperature is generally 40° C. or higher, preferably from 60° C. to 450° C., and the highest temperature may be as same as the activating temperature. The drying time may be shorter under a negative pressure or vacuum condition. Generally, after drying or dehydrating process, the water content in the product is about 10% or less. The activating process is carried out at a certain temperature, generally 100° C. or higher, the maximal up to 1200° C. or more, preferably from 150° C. to 750° C., depending on the difference of material used. Generally, when the purificatant mainly contains iron or cobalt, the activating temperature may be higher, and it may be lower, when the purificant is mainly consisted of manganese or copper. Drying and activating can be carried out in one step, or in separate steps, and the result is almost the same. Generally, the activating temperature should be lower than the decomposition temperature of relative salts. When the activation temperature exceeds the decomposition temperature of said salts, the salts may be decomposed to oxides. The purificant may be molded before being dried and activated, and a certain amount of molding agent may be added. If the product after mixing reaction contains much more water and is not easily to be molded, it may be pre-dried to a certain value of water content (about 15-30% of total content) and then be molded to the required shapes such as honeycombs, plates and granules. Drying and activating can be carried out in inert gases such as air or nitrogen or under negative pressure, or in the presence of reducing agents to prevent the oxidation of low-valent metals in the product. The reducing agents mainly include hydrogen, hydrocarbons such as methane and formaldehyde, ammonia or urea, and carbon monoxide. The amount of the reducing agent added is not particularly required. During the activating process, when the gas component in gas stream is no longer changed, the activating process is regarded to be completed, and the obtained solid product is a kind of said purificant. Heating can be carried out by various heating means such as electric furnace, heat conducting medium, electromagnetic and microwave, and the effect is equivalent.

In the preparation of said purificant, the sulfate or chloride of component A and P may be replaced by the combination of corresponding metals or oxides or salts thereof and hydrochloric acid or sulfuric acid solution. The hydroxides of component A and P may be replaced by the combination of the salts of corresponding metals and alkali solutions such as ammonia. For example, the material of ferrous sulfate can be replaced by the combination of iron or ferrous oxide or ferrous sulfide and dilute sulfuric; the material of manganese chloride can be obtained by reacting manganese oxide with hydrochloric acid; ferric chloride can be obtained by reacting iron phosphate with hydrochloric acid, and further to obtain iron hydroxide by adding calcium hydroxide and filtering off the water content. The hydroxides of alkali metals of component B can also be obtained by the reaction of corresponding metal oxides with water, and the metal oxides of alkaline earth metal component F can be obtained by the decomposition of their corresponding carbonates. The effect of the purificant prepared by the combination of the above materials in place of the corresponding materials is the same as the preparation method mentioned above.

In the preparation process of the purificant of the present invention, a certain amount of a molding agent may be added. The molding agent includes one or any two or more of oxides and hydroxides and sulfates and carbonates of component F, and all related derivatives (including acid or basic or polymeric compounds or complex salts or coordination compounds, etc.), clay and silicate (such as calcium silicate, magnesium silicate or aluminum silicate, etc.). The main purpose of adding molding agent is to absorb water in the product and to form easily, and can act as an adsorption auxiliary. The molding agent may be added to the mixing reactor simultaneously with other materials, or before drying and activating of the product, and the effect is equivalent. The addition amount of molding agent depends on the need, generally from 1 to 85% of the volume of total material. The other preparation processes are the same as above. The molding of purificant is similar to the preparation of an industrial catalyst or an adsorbent. For details, refer to the relevant chemical engineering manuals.

In the preparation of the purificant of the present invention, one or any two or more of the metals and their oxides of component A and P may be added as a compounding agent, and the content of the compounding agent is generally less than 95% of total amount. The compounding agent does not participate in the mixing reaction in the preparation process, but it may play a catalytic role in the purification process.

In the preparation of the purificant of the present invention, a certain amount of organic solvent may be added into the materials before the drying and activating process, wherein the said organic solvent mainly includes acetone, methyl ethyl ketone, ethanol or propanol and others. The addition amount of the solvent is no special requirement, where the volume ratio of organic solvent to the material is generally 1 to 1 or less. The solvent will volatilize after heating, so that the specific surface of the purificant can be increased, resulting in the increase of purification efficiency.

In the preparation of the purificant of the present invention, a small amount of transition metal oxides such as titanium dioxide, tungsten trioxide, vanadium pentoxide, rare earths, or palladium, platinum or other noble metals may be added into the purificant as a catalytic assistant. The content of the metal oxides is generally less than 10%, and the noble metal is generally less than 0.5% in the purificant. The effect of these metal oxides or noble metals is substantially equivalent.

In the preparation of the purificant of the present invention, the purificant may also be loaded on a general-purpose catalyst carrier such as alumina particles or honeycomb ceramics, and the preparation is also similar to the preparation of the related catalyst.

The purification method of said purificant of present invention is to introduce the purificant obtained from the above preparation processes into a gas-solid reactor, and the nitrogen oxides in gas streams can be adsorbed by the purificant so as to achieve the purpose of gas purification.

A gas-solid reactor, such as a fixed bed, a moving bed, an ebullated bed, a fluidized bed or a circulating fluidized bed reactor can be adopted in present invention, which are commonly used in chemical processes, and the flow of gas and solid purificant in the reactor can be arranged in the way of entrain flow, counterflow, cross flow and other flow forms. The effect of the above arrangements is roughly the same. For more details of the reactor structure, the relevant chemical reaction equipment manuals may be consulted.

A circulating fluidized bed gas-solid reactor used in present invitation comprises a column body, a gas inlet, and a purificant adding port. The purificant particles can be added by means of mechanical feeding or pneumatic feeding method, and the effect is equivalent. A gas flow distributor is arranged above the gas inlet in the column. The upper part of the column body is provided with a connecting pipe, which is communicated with a gas-solid separator. After gas-solid separation in the gas-solid separator, the purified gas flow is discharged from the upper part of the gas-solid separator, and the used purificant particles are discharged from the bottom of the gas-solid separator. Part of the discharged purificant may be returned to the reactor again for further reaction (the range can be from 0 to 100%).

A countercurrent moving bed gas-solid reactor used in present invitation comprises a column body, a gas inlet, a purificant adding port, a gas outlet, and a purificant discharge port. The gas inlet is communicates with the gas outlet through a gas-solid reaction zone in the column, and the purificant adding port is communicates with purificant discharge port through the gas-solid reaction zone and a purificant recovery zone. The treatment process is carried out by introducing the gas stream from the gas inlet to the column and at the same time the purificant was added into the column by the purificant inlet port. In the gas-solid reaction zone, the gas-solid adsorption chemical reaction between nitrogen oxide in the gas stream and the purificant takes place. The purified gas stream is discharged from the gas outlet at the upper part of the reactor, and the used purificant is discharged from the purificant discharge port.

A fixed bed gas-solid reactor used in present invitation comprises a column body, a gas inlet, a gas flow distributor, a purificant filling layer in the column, a purificant adding port, a purificant discharge port, and a gas outlet. The gas inlet communicates with the gas outlet through the gas flow distributor and the void of the purificant filling layer. The treatment process is carried out by introducing gas stream from the gas inlet to the purificant filling layer through the gas flow distributor. In the purificant filling layer, the gas-solid adsorption chemical reaction between nitrogen oxide in the gas stream and the purificant takes place. The purified gas stream is discharged from the gas outlet at the upper part of the reactor, and the used purificant can be periodically discharged from the purificant discharge port.

The working temperature of the purificant of the present invention is generally above 60° C., and the highest temperature is the same as the highest activation temperature of the purificant, and the preferred temperature range is from 200° C. to 500° C. The working temperature may be higher using the purificant containing mainly iron or cobalt, and it may be lower if the purificant mainly contains manganese and copper. If the temperature of the gas stream entering the gas-solid reactor is lower than 60° C., the purificant should be activated by heating at the temperature of 100° C. or higher in advance. Generally, the gas-solid contact time of the nitrogen oxide and the purificant in the reactor is about 0.05 s or more. The removal of $NO_x$ increases with the increase of gas-solid contact time in the reactor, and the preferable gas-solid contact time is from 0.2 s to 20 s. The theoretical molar ratio of the purificant to the nitrogen oxide is about 1:0.5 to 1:2 according to the content of component A and P in purficant, and which is also related to the content of component B and F in the purificant and the structure of the purificant. In practical operation, the dosage of the purificant can be determined according to characteristics of the purificant, reaction temperature, gas-solid contact time, removal requirements, and other relative factors. For a circulating fluidized bed gas-solid reactor, the molar ratio of the purificant to the nitrogen oxide is generally 1 or more (based on the component of A and P), and the larger the molar ratio, the better the removal on the nitrogen oxides, preferably from 5 to 100. For the reactors such as fixed bed, moving bed and ebullating bed, there is no specific requirement for the dosage of the purificant, and added as needed. The particle size and structure of the purificant can be also selected according to different reactors. The solid particle of purificant can be used for the fluidized bed, the moving bed and the ebullating bed, and the particle size is selected generally from 0.01 mm to 20 mm, which can be referred to the chemical design manual of the corresponding reactor. For fixed bed, spherical, flat or honeycomb ceramic shape can be selected.

In the remove of nitrogen oxides by using said purificant, the effect of the purificant mainly composed of manganese or copper of component P is the best, and mainly composed of iron of component A or cobalt of component P is slightly worse. When the gas stream contains a relative high concentration of carbon dioxide, it is preferred to use the purificant prepared by carbonates.

The used purificant can be regenerated by desorption in an inert gas such as air or nitrogen at a certain temperature, or can be regenerated in the presence of a reducing agent. The reducing agent includes hydrocarbons such as hydrogen and methane, carbon oxyhydroxide such as formaldehyde, ammonia and urea, and carbon monoxide. The regeneration temperature is usually 150° C. or higher, and may be lower under a negative pressure. The regeneration temperature is equivalent to the activating temperature of said purificant, and may be higher than the activating temperature, preferably from 450° C. to 850° C. The regeneration temperature may be higher for the purificant containing sulfate, and lower for the chloride in purificant. The purificant after adsorbing only $NO_x$ can be regenerated by desorption, and it after adsorbing both nitrogen oxides and $SO_2$ can be regenerated in the presence of a reducing agent, and the regeneration temperature can be higher.

The gas stream according to present invention is a nitrogen oxide-containing flue gas which includes exhaust gases from fossil fuel combustion, such as thermal power generation, building material and smelting industries, and from various types of vehicle and marine internal combustion engines, and other relative industrial processes. Said nitrogen oxides or nitrogen oxide is nitric oxide or mainly nitric oxide.

Compared with the prior art, the instant invention has the advantages that nitrogen oxide in gas stream can be removed by gas-solid adsorption reaction in a certain range of temperature, thereby achieving gas purification, and the used purificant can be recycled by regeneration.

DETAILED DESCRIPTION

The instant invention is further described in detail below with reference to the accompanying drawings and embodiments. The examples are illustrated by using the compound of ferrous sulfate of material A as a representative, and other similar compounds of materials A and P are exemplified. Material H is represented by an alkali metal hydroxide or an alkaline earth metal oxide and hydroxide, and other compounds of material H are exemplified.

Example 1

A preparation method of the purificant: add ferrous sulfate, sodium hydroxide and water to a mixing reactor at a ratio of about 1:0.1:2 (molar ratio, same below). After the mixing reaction (about 10-30 minutes, same below, maybe some different for different materials), the product is dried and activated in air sequentially. Drying temperature is about 40 to 60° C. and lasting for about 3 hours to remove the water content in the product. Activating temperature is about 100° C. When the gas component in the gas stream is no longer changed, the activation process is completed, and the obtained solid product is one purificant of present invention.

Example 2

A preparation method of the purificant: add cobalt sulfate heptahydrate and sodium hydroxide to a mixing reactor at a ratio of about 1:1. After the mixing reaction, the product is dried and activated in air sequentially. Drying temperature is about 60 to 95° C. and lasting for about 2 hours. Activating temperature is about 150° C. When the gas component in the gas stream is no longer changed, the activation process is completed, and the obtained solid product is one purificant of present invention.

Example 3

A preparation method of the purificant: add ferrous sulfate heptahydrate and sodium hydroxide to a mixing reactor at a ratio of about 1:2. After the mixing reaction, the product is dried and activated in nitrogen gas sequentially. Both the drying and activating temperature is the same of about 250° C. and lasting for about 2 hours (including activation). The obtained solid product is one purificant of present invention.

Example 4

A preparation method of the purificant: add manganese sulfate tetrahydrate and lithium hydroxide to a mixing reactor at a ratio of about 1:3. After the mixing reaction, the product is dried and activated in nitrogen gas sequentially. Drying temperature is about 60 to 95° C. and lasting for about 2 hours. Activating temperature is about 350° C. When the gas component in the gas stream is no longer changed, the activation process is completed, and the obtained solid product is one purificant of present invention.

Example 5

A preparation method of the purificant: add copper sulfate pent hydrate and potassium hydroxide to a mixing reactor at a ratio of about 1:2. After the mixing reaction, the product is dried and activated in air sequentially. Both the drying and activating temperature is about 450° C. and lasting for about 1 hour (including activation). The final obtained solid product is one purificant of present invention.

Example 6

A preparation method of purificant: add ferrous sulfate heptahydrate, sodium carbonate and water to a mixing reactor at a ratio of about 1:1:2 and heat appropriately. After the mixing reaction, the product is dried and activated in nitrogen gas sequentially. Drying temperature is about 60 to 95° C. and lasting for about 2 hours. Activating temperature is about 450 to 500° C. When the gas component in the gas stream is no longer changed, the activation process is completed, and the obtained solid product is one purificant of present invention.

Example 7

A preparation method of the purificant: add ferrous hydroxide, sodium sulfate and water to a mixing reactor at a ratio of about 1:1:3. After the mixing reaction, the product is dried in the temperature range of about 60 to 95° C. under a reduced pressure and lasting for about 1 hour. The sequential activation is performed in nitrogen gas at the temperature of 450° C. When the gas component in the gas stream is no longer changed, the activation process is completed, and the obtained solid product is one purificant of present invention.

Example 8

A preparation method of the purificant: add ferrous carbonate, potassium hydroxide, sodium sulfate and water to a mixing reactor at a ratio of about 1:2:1:5. After the mixing reaction, the product is dried and activated in nitrogen gas sequentially. Drying temperature is about 60 to 95° C. and lasting for about 2 hours. Activating temperature is about 550° C. When the gas component in the gas stream is no longer changed, the activation process is completed, and the obtained solid product is one purificant of present invention.

Example 9

A preparation method of purificant: add manganese carbonate, sodium hydroxide, calcium sulfate and water to a mixing reactor at a ratio of about 1:2:1:5. After the mixing reaction, the product is dried and activated in nitrogen gas sequentially. Drying temperature is about 60 to 95° C. and lasting for about 2 hours. Activating temperature is about 500° C. When the gas component in the gas stream is no longer changed, the activation process is completed, and the obtained solid product is one purificant of present invention.

Example 10

A preparation method of purificant: add basic copper carbonate, sodium sulfate and water to a mixing reactor at a ratio of about 1:1:5. After the mixing reaction, the product is dried in nitrogen gas and activated in air sequentially. Drying temperature is about 60 to 95° C. and lasting for about 2 hours. Activating temperature is about 500° C. When the gas component in the gas stream is no longer changed, the activation process is completed, and the obtained solid product is one purificant of present invention.

Example 11

A preparation method of the purificant: add about 20% the volume of the product obtained by mixing manganese sulfate tetrahydrate and potassium hydroxide before drying in above example 4, and the other operation steps are the same. The final obtained solid product is a purificant of present invention.

Example 12

A preparation method of the purificant: add ferrous sulfate, ammonia water (concentration about 35%) and calcium sulfate to a mixing reactor at a ratio of about 1:1:2. After the mixing reaction, precipitate and remove the clear water layer. The solid product is then dried and activated in air sequentially. Drying temperature is about 40 to 60° C. and lasting for about 3 hours. Activating temperature is about 450° C. When the gas component in the gas stream is no longer changed, the activation process is completed, and the obtained solid product is one purificant of present invention.

Example 13

A preparation method of the purificant: each solution (about 50% water) of ferric sulfate, ferrous chloride, ferric chloride, cobalt chloride, manganese chloride or copper chloride is respectively mixed with sodium hydroxide in a mixing reactor at a ratio of about 1:1.5. After the mixing reaction, calcium carbonate (30% of the amount of above product after mixing reaction) is added into the mixing reactor as a molding agent. The solid product is then dried and activated in nitrogen gas sequentially. Drying temperature is about 60 to 95° C. and lasting for about 2 hours. Activating temperature is about 450° C. When the gas component in the gas stream is no longer changed, the activation process is completed, and the obtained solid product is one purificant of present invention.

Example 14

A preparation method of said purificant: add ferrous sulfate heptahydrate, cobalt sulfate heptahydrate, manganese sulfate tetrahydrate, copper sulfate pentahydrate and potassium hydroxide to a mixing reactor at a ratio of about 1:1:1:1:8. After the mixing reaction, the product is dried and activated in nitrogen gas sequentially. Drying temperature is about 60 to 95° C. and lasting for about 2 hours. Activating temperature is about 550° C. When the gas component in gas stream is no longer changed, the activation process is completed, and the obtained solid product is one purificant of present invention.

Example 15

A preparation method of said purificant: add titanium dioxide solid powder (anatase phase) to the product after the mixing reaction in above example 3 (the amount of titanium dioxide added occupied a 10% of the weight of total material). After mixing reaction, the product is dried in temperature range of about 40 to 60° C. under a reduced pressure and lasting for about 2 hour. The sequential activation is performed in nitrogen gas at 350° C. When the gas component in gas stream is no longer changed, the activation process is completed, and the obtained solid product is one purificant of present invention.

Example 16

A preparation method of said purificant: add kaolin (also called clay) as a molding agent and iron powder as a compounding agent to the product after the mixing reaction in above Example 3, the dosage of kaolin is about 20% of the weight of total material, and iron powder is about 95%. After completely mixing, the mixture is preformed to the shape of honeycomb cylinder with the dimensions of 50 mm in diameter and 50 mm long, and 15 holes (each 3 mm in diameter) uniformly distributed across the section of the honeycomb cylinder, and then dried and activated in nitrogen gas sequentially. Drying temperature is about 60 to 95°

C. and lasting for about 2 hours. Activating temperature is about 350° C. The final obtained product is one purificant of present invention.

Example 17

A preparation method of said purificant: add 0.1% (by mass) of palladium powder to the product after the mixing reaction in above example 3 together with porous alumina particles (about 3 mm in diameter) with the same volume of the product. After mixing reaction, the mixture is dried and activated in nitrogen gas sequentially. Drying temperature is about 60 to 95° C. and lasting for about 2 hours. Activating temperature is about 300° C. The final obtained solid product is one purificant of present invention.

Example 18

A preparation method of the purificant: add calcium sulfate dihydrate as a molding agent to the product after the mixing reaction in above example 14, the dosage of calcium sulfate dihydrate is about 15% of the weight of total material. After mixing reaction, the mixture is preformed to the shape of honeycomb cylinder as the same demension as in example 16, and then dried and activated in nitrogen gas sequentially. Drying temperature is about 60 to 95° C. and lasting for about 2 hours. Activating temperature is about 350° C. The final obtained product is one purificant of present invention.

Example 19

Figure 1:
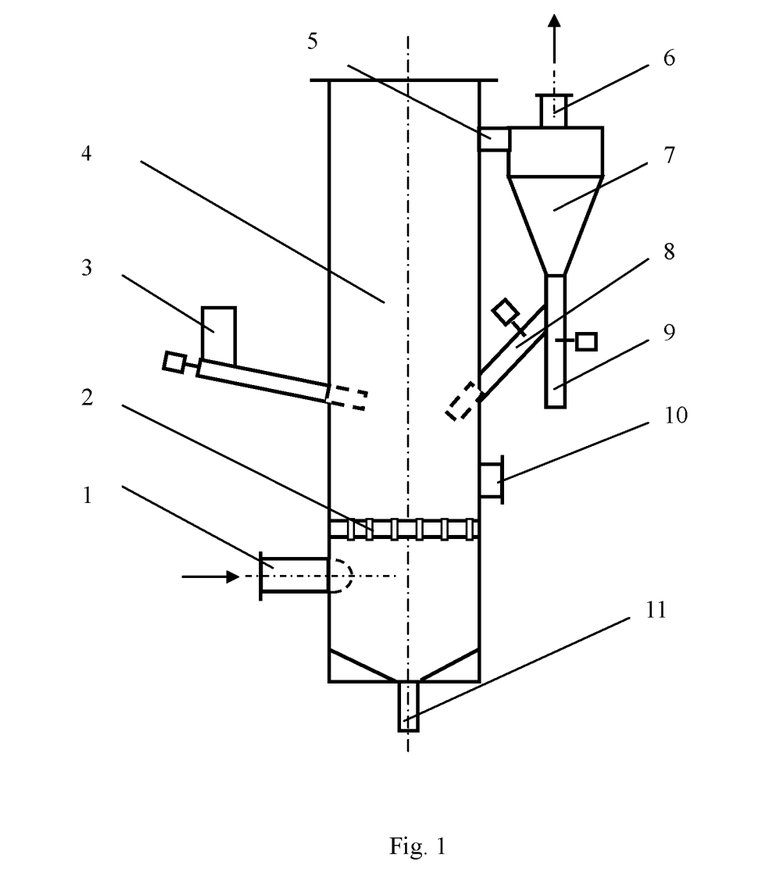
FIG. 1 is a schematic structural view of a circulating fluidized bed gas-solid reactor.

A circulating fluidized bed gas-solid reactor is shown in FIG. 1. The reactor comprises a column body (4), a gas inlet (1) which is provided at the lower part of the column body, and a purificant adding port (3) is arranged in the middle part of the column body. A gas stream distributor (2) is arranged above the gas inlet in the column. The upper part of the column body is provided with a connecting pipe (5), which is communicated with a gas-solid separator (7); the upper part of the gas-solid separator is provided with a gas outlet (6), and the bottom of the gas-solid separator is provided with a purificant discharge port (9) and a purificant return port (8) connects to the column body; the lower part and the bottom of the column body are provided with an inspection port (10) and a bottom purificant discharge port (11), respectively.

The treatment process is carried out by introducing the gas stream from the gas inlet (1) into the column body (4) through the gas distributor (2) and the purificant particles into the column body (4) through the purificant adding port (3) as well. With the mixing of gas and solid particles in the column, the gas-solid adsorption reaction takes place, and nitrogen oxide in gas stream is adsorbed by the purificant. Then the mixture of gas and solid products are led into the gas-solid separator (7) through the connecting pipe (5) for gas-solid separation, and then the cleaned gas stream is discharged from the gas outlet (6), and a part of unreacted purificant particles discharged from gas-solid separator (7) may be fed back to the column body (4) through the purificant return port (8) to participate in the gas-solid reaction again, and the remaining part of the particles may be discharged through the purificant discharge port 9. A bottom purificant discharge port (11) is also provided for discharging excess solid particles in the column.

The dimension of the circulating fluidized bed gas-solid reactor is 60 mm in diameter and 2500 mm in height, using 316L stainless steel as the material. The gas stream is composed of oxygen about 8% by volume, moisture about 10% by volume, nitrogen oxides (containing about 95% NO) 500 ppm, and the balance nitrogen gas. The gas flow rate is about 5 m³/h (gas-solid contact time in the column is estimated from about 0.05 s to 3 s). The purificants prepared in examples 1-15 are respectively used, and the average particle diameter of the purificant is about 0.5 mm. The amount of the purificant added into the reactor by a mechanical metering feeder with a feeding rate of about 2-3 kg/h, and the temperature of the purificant after imported is the same as the temperature of the gas in the reactor. The product particles separated by the gas-solid separator (cyclone separator) are not returned to the reactor.

When the temperatures of gas stream introduced to the column are 100° C., 250° C., 350° C., 450° C. and 550° C., respectively, the experimental results show the gas outlet $NO_x$ concentrations (in ppm, same below) are: 461, 422, 381, 390 and 423 (example 1); 442, 323, 193, 101 and 283 (example 2); 423, 235, 71, 57 and 225 (example 3); 416, 215, 65, 56 and 245 (example 4); 395, 154, 55, 43 and 265 (example 5); 422, 147, 60, 56 and 216 (example 6); 466, 234, 197, 239 and 296 (example 7); 419, 193, 45, 29 and 231 (example 8); 396, 149, 53, 47 and 263 (example 9); 392, 187, 53, 42, and 255 (example 10); 393, 194, 57, 51 and 235 (example 11); 436, 210, 73, 87 and 263 (example 12); 425, 233, 64, 66 and 252 (using ferric sulfate, example 13); 195, 223, 54, 61 and 222 (using ferrous chloride, example 13); 215, 243, 74, 91 and 262 (using ferric chloride, example 13); 442, 247, 76, 81 and 293 (using cobalt chloride, example 13); 412, 207, 66, 78 and 305 (using manganese chloride, example 13); 395, 177, 56, 80 and 335 (using copper chloride, example 13); 411, 177, 56, 48 and 231 (example 14); 415, 217, 67, 54 and 212 (example 15).

Example 20

Figure 2:
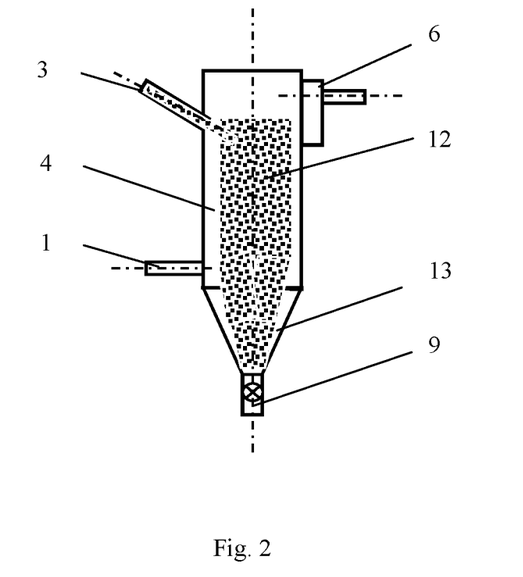
FIG. 2 is a schematic structural view of a countercurrent moving bed gas-solid reactor.

A countercurrent moving bed gas-solid reactor is shown in FIG. 2. It comprises a column body (4), a gas inlet (1) which is arranged at a lower part of the column body, a purificant adding port (3) and a gas outlet (6) which are separately arranged at the upper part of the column body, and a purificant discharge port (9) which is provided at the bottom of the column. The gas inlet (1) is communicates with the gas outlet through a gas-solid reaction zone (12) in the column, and the purificant adding port (3) is communicates with purificant discharge port (9) through the gas-solid reaction zone (12) and a purificant recovery zone (13). The column body (4) has a diameter of 60 mm and a height of 1500 mm, using 316L stainless steel as the material, and an effective height of the gas-solid reaction zone (12) is about 1000 mm.

The treatment process is carried out by introducing the gas stream from the gas inlet (1) into the column body (4) and the purificant particles into the column body (4) through purificant adding port (3) as well. With the mixing of gas and purificant particles in the gas-solid reaction zone (12), the gas-solid adsorption reaction between nitrogen oxides and purificant takes place. The purified gas is then discharged from gas outlet (6), and the solid particles after reaction are discharged from the purificnt discharge port (9) through the purificant recovery zone (13).

The carrier gas is air at room temperature, and the relative humidity of air is about 70%. The concentration of nitrogen monoxide in the gas stream is about 450 ppm, and the gas flow rate is about 1 m³/h, and the gas-solid contact time in the reactor is about 3 to 15 s. The purificant with an average particle diameter of about 0.5 mm prepared in example 5 was adopted, and the addition amount of the purificant is about 2 kg/h. When the temperatures of gas stream in the reactor were about 60° C., 250° C., 350° C. and 450° C., respectively, the experimental results showed that the NO concentration (ppm) of the gas outlet was 435, 43, 12 and 35, respectively.

Example 22

Figure 3:
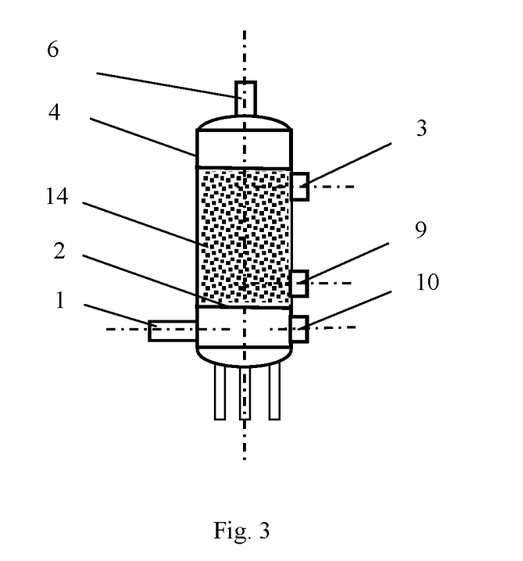
FIG. 3 is a schematic structural view of a fixed bed gas-solid reactor gas-solid reactor.

A fixed bed gas-solid adsorption reactor is shown in FIG. 3. It comprises a column body (4), a gas inlet (1) which is provided at the lower part of the column body, a gas flow distributor (2) which is arranged above the gas inlet in the column body, a purificant filling layer (14) which is arranged above the gas flow distributor, a purificant adding port (3) which is arranged above the purificant filling layer, a purificant discharge port (9) which is arranged at the lower part of the purificant filling layer, and a gas outlet (6) at the upper part of the column body. The gas inlet (1) communicates with the gas outlet (6) through the gas flow distributor (2) and the void of the purificant filling layer (14). The column body (4) has a diameter of 60 mm and a height of 1500 mm, using 316L stainless steel as the material.

The treatment process is carried out by introducing the nitrogen oxide-containing gas stream from the gas inlet (1) to the purificant filling layer (14) through the gas flow distributor (2). In the purificant filling layer (14), the gas-solid adsorption reaction between nitrogen oxide and the purificant takes place. The purified gas stream is discharged from the gas outlet (6) at the upper part of the reactor, and the used purificant can be periodically discharged from the purificant discharge port (9).

Two kinds of molded purificants of alumina supported purificant and honeycomb purificant prepared in examples 16 to 18 were used, respectively. The bulk density of both purificants is about 1500 kg/m$^3$, and the filling height of the purificant in the reactor was about 200 mm, and the outer wall of the reactor was heat insulated.

A simulating gas stream of automobile exhaust gas was tested, wherein the concentration of the pollutants in the gas stream are about 350 ppm of nitric oxide (NO), about 50 ppm of sulfur dioxide, 10% of carbon dioxide (volume, the same below), about 150 mg/m$^3$ of carbon monoxide and hydrocarbons, and oxygen content of 1%. The gas flow rate is about 1.5 m$^3$/h with a gas residence time of about 0.3 s to 3 s. When the temperatures of gas stream into the reactor are about 150° C., 300° C., 400° C. and 550° C., respectively, the experimental results of the gas outlet concentrations of pollutants are as follows: Using the honeycomb purificant in example 16, $NO_x$ concentrations (ppm) are about 322, 275, 265 and 285; $SO_2$ concentrations (ppm) are about 42, 55, 43 and 46; carbon monoxide and hydrocarbon concentration (mg/m$^3$) are about 66, 25, 0 and 0. Using alumina supported purificant in example 17, $NO_x$ concentrations (ppm) are about 276, 125, 106, and 202; $SO_2$ concentration (ppm) are about 15, 18, 40, and 47; carbon monoxide and hydrocarbon concentrations (mg/m$^3$) are about 57, 4, 0, and 0. Using the honeycomb purificant in example 18, the gas outlet concentrations were $NO_x$ (ppm) of about 182, 33, 42 and 175, $SO_2$ (ppm) of about 9, 12, 35 and 45, respectively, and the concentration of both carbon monoxide and hydrocarbon (mg/m$^3$) are about 31, 1, 0, and 0, respectively. Since the amount of the purificant added to the reactor is fixed, the removal of the harmful substances in gas stream may be varied with the consumption of the purificant, and the concentrations showed above is the value when the maximum removal is achieved.

Example 23

In the reactor of example 22, the purificant particles of example 14 after used in the test of example 19 was regenerated in air. The gas flow rate of air stream is about 1 m$^3$/h; the temperature of gas stream in the reactor is about 600° C., and the regenerating time is about 1 hour. The regeneration is completed when the outlet gas composition no longer changes.

Example 24

In the reactor of example 22, the honeycomb purificant of example 18 after used in the test of example 22 was regenerated in nitrogen gas. The gas flow rate of the gas stream is about 1 m$^3$/h with 1% carbon monoxide as a reducing agent. The temperature of the gas stream in the reactor is about 750° C., and the reaction time is about 1 hour. The regeneration is completed when the outlet gas composition no longer changes.

Example 25

A preparation method of the purificant: add ferrous sulfate heptahydrate, calcium oxide and water to a mixing reactor at a ratio of about 1:2:1. After the mixing reaction, the product is then dried and activated in nitrogen gas sequentially. Drying temperature is about 60 to 95° C. and lasting for about 2 hours. Activating temperature is about 750° C. with 0.5% of methane as a reducing agent. When the gas component in gas stream is no longer changed, the activation process is completed, and the obtained solid product is one purificant of present invention.

Example 26

A preparation method of the purificant: add copper sulfate pentahydrate, barium hydroxide and water to a mixing reactor at a ratio of about 1:1.5:1. After the mixing reaction the product is then dried and activated in air sequentially. Drying temperature is about 60 to 95° C. and lasting for about 2 hours. Activating temperature is about 500° C. When the gas component in gas stream is no longer changed, the activation process is completed, and the obtained solid product is one purificant of present invention.

Example 27

A preparation method of the purificant: add manganese sulfate tetrahydrate, calcium carbonate and water to a mixing reactor at a ratio of about 1:1:2. After the mixing reaction, the product is then dried and activated in air sequentially. Drying temperature is about 60 to 95° C. and lasting for about 2 hours. Activating temperature is about 450° C. When the gas component in gas stream is no longer changed, the activation process is completed, and the obtained solid product is one purificant of present invention.

Example 28

A preparation method of the purificant: add ferrous carbonate, manganese carbonate and basic copper carbonate to a mixed reactor with magnesium hydroxide, sodium sulfate and water at a ratio of about 1:2:1:6, respectively. After the mixing reaction, the product is then dried and activated in nitrogen gas sequentially. Drying temperature is about 60 to 95° C. and lasting for about 2 hours. Activating temperature is about 550° C. When the gas component in gas stream is no longer changed, the activation process is completed, and the obtained solid product is one purificant of present invention.

Example 29

A preparation method for the purificant: each solution (about 50% water) of the solution of ferric sulfate, ferrous chloride, ferric chloride, cobalt chloride, manganese chloride and copper chloride is respectively mixed with calcium oxide in a mixing reactor at a ratio of about 1:3. After the mixing reaction, the product is then dried and activated in nitrogen gas sequentially. The other operation procedure is the same as in example 26, and the obtained solid product is one purificant of present invention.

Example 30

A preparation method of the purificant: add ferrous sulfate heptahydrate, cobalt sulfate heptahydrate, manganese sulfate tetrahydrate, copper sulfate pentahydrate and calcium oxide to a mixing reactor at a ratio of about 1:1:1:1:6. The other operation procedure is the same as in example 28, and the obtained solid product is one purificant of present invention.

Example 31

A preparation method of said purificant: add clay as a molding agent to the product after the mixing reaction in above example 29 with a dosage of about 30% of the weight of total material. After completely mixing, the mixture is preformed to the shape of honeycomb cylinder with the same dimensions in example 16, and then dried and activated in nitrogen gas sequentially. The drying temperature is about 150° C. and lasting for about 1 hour. The activating temperature is about 550° C. The final obtained product is one purificant of present invention.

Example 32

The reactor is the same as used in example 19. The purificants prepared in examples 25-30 are adopted, which have an average particle diameter of about 0.5 mm, and the amount of purificant added to the reactor is about 2-3 kg/h. Other operating conditions are the same as in example 19. When the temperatures of gas stream introduced to the column are 250° C., 350° C., 450° C. and 550° C., respectively, the results show the gas outlet $NO_x$ concentrations (ppm) are: 320, 122, 81 and 393 (example 25); 310, 102, 75 and 380 (example 26); 336, 149, 105 和 392 (example 27); 305, 123, 71 and 315 (using ferrous carbonate, example 28); 295, 113, 65 and 285 (using manganese carbonate, example 28); 285, 103, 51 and 290 (using basic copper carbonate, example 28); 325, 143, 94 and 320 (using iron sulfate, example 29); 312, 127, 89 and 313 (using ferrous chloride, example 29); 321, 135, 92 and 331 (using ferric chloride, example 29); 341, 167, 121 and 335 (using cobalt chloride, example 29). 290, 87, 89 and 333 (using manganese chloride, example 29); 289, 83, 95 and 353 (using copper chloride, example 29); and 285, 68, 66 and 315 (example 30).

Example 33

The reactor is the same as used in example 20. The concentration of nitric oxide in the gas stream is about 450 ppm, and the concentration of sulfur dioxide is about 500 ppm, and the gas flow rate is about 1 $m^3/h$. the purificant prepared in examples 30 is adopted, which has an average particle diameter of about 0.5 mm, and the amount of addition is about 2-3 kg/h. Other operating conditions are the same as in the example 20. When the inlet gas temperature is 150° C., 300° C., 450° C. and 600° C., the result shows that $NO_x$ concentration (in ppm) of the gas outlet is 190, 62, 45 and 335, respectively, and the concentration of $SO_2$ (in ppm) is 169, 265, 355 and 475, respectively.

Example 34

The reactor is the same as used in example 22. The purificant prepared in example 31 is adopted. Other operating conditions are the same as in the example 22. When the inlet gas temperature is 150° C., 300° C., 450° C. and 600° C., the gas outlet concentrations of pollutants are 195, 72, 65 and 225 for $NO_x$ (ppm), respectively, and 10, 17, 35 and 46 for $SO_2$ (ppm), respectively, and 65, 8, 0, and 0 for carbon monoxide and hydrocarbon ($mg/m^3$), respectively.

Example 35

In the reactor of example 22, the purificant particles of example 30 after used in the test of example 32 was regenerated in air. The gas flow rate of air stream is about 1 $m^3/h$; the temperature of gas stream in the reactor is about 600° C., and the regenerating time is about 1 hour. The regeneration is completed when the outlet gas composition no longer changes.

Example 36

In the reactor of example 22, the purificant of example 31 after use was regenerated in nitrogen gas. The gas flow rate is about 1 $m^3/h$ with a reducing gas of 0.5% methane. The temperature of the gas stream in the reactor is about 700° C., and the reaction time is about 2 hours. The regeneration is completed when the outlet gas composition no longer changes.

Example 37

A preparation method of said purificant: add ferrous sulfate heptahydrate, cobalt sulfate heptahydrate, manganese sulfate tetrahydrate and copper sulfate pentahydrate respectively to a mixed reactor with potassium hydroxide and calcium oxide at a ratio of about 1:1:3. After the mixing reaction, the product is then dried and activated in nitrogen gas sequentially. Drying temperature is about 40 to 60° C. and lasting for about 3 hours. Activating temperature is about 550° C. When the gas component in gas stream is no longer changed, the activation process is completed, and the obtained solid product is one purificant of present invention.

Example 38

A preparation method of said purificant: add ferrous sulfate heptahydrate, cobalt sulfate heptahydrate, manganese sulfate tetrahydrate and copper sulfate pentahydrate respectively to a mixed reactor with sodium hydroxide and calcium carbonate at a ratio of about 1:1:3. After the mixing reaction, the product is then dried and activated in air sequentially. Drying temperature is about 60 to 95° C. and lasting for about 2 hours. Activating temperature is about 600° C. Other operation procedure is the same with above examples.

Example 39

A preparation method of said purificant: add ferrous carbonate, manganese carbonate and basic copper carbonate respectively to a mixing reaction with potassium hydroxide, calcium carbonate and water at a ratio of about 1:2:2:6. After the mixing reaction, the product is then dried and activated in nitrogen gas sequentially. Drying temperature is about 60 to 95° C. and lasting for about 2 hours. Activating temperature is about 550° C. Other operation procedures are the same with above examples.

Example 40

A preparation method of said purificant: add iron sulfate, cobalt sulfate heptahydrate, manganese sulfate tetrahydrate and copper sulfate pentahydrate respectively to a mixing reactor with potassium carbonate and water at a ratio of about 1.5:1:3. After the mixing reaction, calcium oxide (10% of the total amount of the product) is added into the mixing reactor as a molding agent. Other operation procedures are the same with example 39.

Example 41

A preparation method of said purificant: The solution (about 50% water) of ferrous chloride, ferric chloride, cobalt chloride, manganese chloride and copper chloride is mixed with sodium hydroxide and carbonic acid in a mixing reactor at a ratio of about 1:2:2, respectively. After the mixing reaction, the product is then dried and activated in nitrogen gas sequentially. Drying temperature is in the range of about 60 to 95° C. and lasting for about 2 hours. Activating temperature is about 500° C. The final obtained solid product is one purificant of present invention.

Example 42

A preparation method of the purificant: the products obtained after mixing reaction in example 38 are preformed to honeycomb cylinders with the same dimensions as in example 16, respectively, and then dried and activated in a nitrogen gas, sequentially. Drying temperature is in the range of about 60 to 95° C. and lasting for about 2 hours. Activation temperature is about 650° C. The final obtained product is one purificant of present invention.

Example 43

The reactor is the same as used in example 19. The purificants prepared in examples 37-41 are adopted, which have an average particle diameter of about 0.5 mm, and the amount of purificant added to the reactor is about 2-3 kg/h. The concentration of carbon dioxide in gas stream is about 10% by volume and other operating conditions are the same as in example 19. When the temperatures of gas stream introduced to the column are 250° C., 350° C. and 450° C., respectively, experimental result shows that the $NO_x$ concentrations (ppm) at gas outlet are: 251, 65, and 93 (using ferrous sulfate heptahydrate in example 37); 276, 85 and 103 (using cobalt sulfate heptahydrate in example 37); 191, 55 和 123 (using manganese sulfate tetrahydrate in example 37); 201, 52 and 115 (using copper sulfate pentahydrate in example 37); 195, 55 and 82 (using ferrous carbonate in example 39); 172, 49 and 113 (using manganese carbonate in example 39); 167, 42 and 95 (using basic copper carbonate, example 39); 265, 85 and 143 (using iron sulfate in example 40); 286, 95 and 163 (using cobalt chloride in example 40); 201, 65 and 133 (using manganese sulfate tetrahydrate in example 40); 191, 62 and 145 (using copper sulfate pentahydrate in example 40). When the purificants of example 38 are used, the effects are approximately the same as the purificants of example 37, but lasting longer. When the purificants of example 41 are used, the effects are approximately the same as the purificant of example 38.

Example 44

The reactor is the same as used in example 20. The pollutant-carrying gas is a simulated flue gas. The composition of the sample gas is 450 ppm of NO, 500 ppm of $SO_2$, 10% of $CO_2$, and 10% water content. The gas flow rate is about 1.5 m³/h. The purificants prepared in example 38 are adopted, which has an average particle diameter of about 0.5 mm, and the amount of addition is about 2-3 kg/h. Other operating conditions are the same as in the example 20. When the inlet gas temperatures are 200° C., 300° C. and 400° C., the gas outlet concentrations of $NO_x$ and $SO_2$ (in ppm) are: 220, 85 and 95 ($NO_x$), and 151, 105 and 343 ($SO_2$), respectively, when ferrous sulfate heptahydrate is used; 195, 55 and 90 ($NO_x$), 145, 95 and 325 ($SO_2$), respectively, when manganese sulphate tetrahydrate is used; 165, 45 and 86 ($NO_x$), 171, 125 and 363 ($SO_2$), respectively, when copper sulfate pentahydrate is used.

Example 45

The reactor is the same as used in example 22. The purificant prepared in example 42 is adopted. Other operating conditions are the same as in the example 22. When the inlet gas temperatures are 150° C., 250° C., 350° C. and 450° C., the minimum gas outlet concentrations of pollutants are: 172, 75 55 and 65 for $NO_x$ (ppm), 7, 16, 36 and 46 for $SO_2$ (ppm), and 52, 10, 0 and 0 for carbon monoxide and hydrocarbon (mg/m³) (using ferrous sulfate heptahydrate as a material), respectively; 205, 145, 95 and 85 for $NO_x$ (ppm), 8, 18, 37 and 47 for $SO_2$ (ppm), and 55, 15, 0 and 0 for carbon monoxide and hydrocarbon (mg/m³) (using cobalt sulphate heptahydrate as a material), respectively; 162, 55, 45 and 65 for $NO_x$ (ppm), 5, 10, 26 and 457 for $SO_2$ (ppm), and 37, 5, 0 and 0 for carbon monoxide and hydrocarbon (mg/m³) (using manganese sulfate tetrahydrate ferrous as a material), respectively; 152, 45, 35 and 45 for $NO_x$ (ppm), 6, 15, 30 and 46 for $SO_2$ (ppm), and 32, 5, 0 and 0 for carbon monoxide and hydrocarbon (mg/m³) (using copper sulfate pentahydrate as a material), respectively.

Example 46

In the reactor of example 22, the used honeycomb purificants prepared in example 42 are regenerated in nitrogen gas. The gas flow rate is about 1 m³/h, and with 1% methane in the gas stream as reducing agent. The temperature of the gas stream in the reactor is about 750° C., and the regeneration time is about 2 hours.

Example 47

In the reactor of example 22, the used purificant particles of example 42 in example 43 were regenerated in air. The gas flow rate of air stream is about 1 m³/h. The temperature of gas stream in the reactor is about from 500 to 700° C. (some different for different purificants) and the regeneration time is about 1 hour.

Example 48

A preparation method of the purificant: dissolve ferrous acetate, ferric nitrate, manganese nitrate and cobalt acetate in water, respectively, and then add sodium hydroxide into above solutions at a mole ratio of 2:1 to obtain metal hydroxides respectively. After filtration to remove water layer, the precipitate is mixed with calcium oxide in an equal molar amount. After mixing reaction, the product is preformed to honeycomb cylinder with the same dimensions as in example 16, and then dried and activated in air. Drying temperature is about 60-95° C. lasting about 2 hours, and activating temperature is about 600° C. The final obtained product is one purificant of present invention, and the effect is equivalent to the similar purificants.

Example 49

A preparation method of the purificant: add ferrous hydroxide, iron hydroxide, manganese hydroxide, cobalt hydroxide, copper hydroxide and cuprous hydroxide respectively to a mixing reactor with sodium sulfate, calcium oxide and water at a ratio of about 1:1:3:6. Other operation procedures are the same with example 39.

Example 50

The reactor is the same as used in example 19. The purificants prepared in example 49 are adopted, which have an average particle diameter of about 0.5 mm, and the amount of purificant added to the reactor is about 2-3 kg/h. Other operating conditions are the same as in example 19. When the temperatures of gas stream introduced to the column are 250° C., 350° C. and 450° C., respectively, the $NO_x$ concentrations (ppm) of gas outlet are: 241, 145, and 93 (using ferrous hydroxide as a material); 262, 160 and 85 (using iron hydroxide as a material); 181, 72 和 96 (using manganese hydroxide as a material); 267, 155 and 136 (using cobalt hydroxide as a material); 191, 65 and 112 (using copper hydroxide as a material); 187, 57 and 119 (using cuprous hydroxide as a material).

Example 51

A preparation method of said purificant: add ferrous hydroxide, iron hydroxide, manganese hydroxide, cobalt hydroxide, copper hydroxide and cuprous hydroxide respectively to a mixing reactor with sodium sulfate, calcium carbonate and water at a ratio of about 1:1:3:6. Other operation procedures are the same with example 42. The final obtained product is one purificant of present invention, and the effect is equivalent to that of similar purificants.

Example 52

A preparation method of said purificant: add ferrous hydroxide, iron hydroxide, manganese hydroxide, cobalt hydroxide, copper hydroxide and cuprous hydroxide respectively to a mixing reactor with sodium chloride, calcium carbonate and water at a ratio of about 1:1:3:6. Other operation procedures are the same with example 39 (activating temperature is about in the range of 500 to 600° C.). The final obtained product is one purificant of present invention.

Example 53

The reactor is the same as used in example 22. The purificants prepared in example 52 are adopted. Other operating conditions are the same as in the example 22. When the inlet gas temperatures are 250° C., 350° C. and 450° C., the minimum gas outlet concentrations of pollutants are: 191, 76 and 85 for $NO_x$ (ppm, the same below), 16, 26 and 46 for $SO_2$ (ppm, the same below), and 25, 0 and 0 for carbon monoxide and hydrocarbon (mg/m³, the same below) (using ferrous hydroxide as a material), respectively; 205, 81 and 95 for $NO_x$, 17, 29 and 47 for $SO_2$, and 27, 0 and 0 for carbon monoxide and hydrocarbon (using ferric hydroxide as a material), respectively; 115, 45 and 65 for $NO_x$, 5, 11, 25 and 42 for $SO_2$, and 15, 0 and 0 for carbon monoxide and hydrocarbon (using manganese hydroxide as a material), respectively; 195, 81 and 85 for $NO_x$, 21, 36 and 47 for $SO_2$, and 25, 0 and 0 for carbon monoxide and hydrocarbon (using cobaltous hydroxide as a material), respectively. 93, 35 and 58 for $NO_x$, 21, 35 and 46 for $SO_2$, and 15, 0 and 0 for carbon monoxide and hydrocarbon (using copper hydroxide as a material), respectively; 85, 26 and 55 for $NO_x$, 20, 31 and 46 for $SO_2$, and 16, 0 and 0 for carbon monoxide and hydrocarbon (using cuprous hydroxide as a material), respectively.

Example 54

In the reactor of example 22, the honeycomb purificants after use in example 53 are regenerated in nitrogen gas. The operation conditions are the same as in example 46. When the gas components in the gas stream no longer change, regeneration is completed.

Example 55

A preparation method of the purificant: add iron hydroxide, manganese hydroxide, cupric tetramminohydroxide and cobalt tetraamminohydroxide respectively to a mixing reactor with calcium carbonate and water at a ratio of about 1:3:4. Other operation procedures are the same with example 42, except that the activation temperature is 500° C. The final obtained product is one purificant of present invention, and the effect is equivalent to similar purificants.

Example 56

The reactor is the same as used in example 22. The purificants prepared in example 55 are adopted. Other operating conditions are the same as in the example 22. When the inlet gas temperatures are 250° C., 350° C. and 450° C., the minimum gas outlet concentrations of pollutants are: 225, 110 and 145 for $NO_x$ (ppm, the same below), 25, 31 and 45 for $SO_2$ (ppm, the same below), and 36, 7 and 0 for carbon monoxide and hydrocarbon (mg/m³, the same below) (using ferric hydroxide as a material), respectively; 195, 69 and 115 for $NO_x$, 15, 30 and 43 for $SO_2$, and 25, 6 and 0 for carbon monoxide and hydrocarbon (using manganese hydroxide as a material), respectively; 255, 161 and 185 for $NO_x$, 15, 27 and 45 for $SO_2$, and 31, 10 and 0 for carbon monoxide and hydrocarbon (using cobalt tetraamminohydroxide as a material), respectively. 193, 85 and 188 for $NO_x$, 20, 32 and 46 for $SO_2$, and 23, 5 and 0 for carbon monoxide and hydrocarbon (using cupric tetramminohydroxide as a material), respectively.

Example 57

A preparation method of the purificant: add ferrous hydrogen carbonate, iron carbonate, oxy basic ferric sulfate, basic manganese chloride, basic cobalt sulfate, and polyaluminium ferric chloride respectively to a mixing reactor with sodium carbonate, calcium silicate and water at a ratio of about 1:2:1:6. Other operation procedures are the same with example 42. The final obtained product is one purificant of present invention, and the effect is equivalent to similar purificants.

Example 58

The reactor is the same as used in example 22. The purificants prepared in example 57 are adopted. Other operating conditions are the same as in the example 22. When the inlet gas temperatures are 200° C., 300° C. and 400° C., the minimum gas outlet concentrations of pollutants are: 147, 61 and 85 for $NO_x$ (ppm, the same below), 21, 37 and 45 for $SO_2$ (ppm, the same below), and 55, 35 and 10 for carbon monoxide and hydrocarbon (mg/m$^3$, the same below) (using ferrous hydrogen carbonate as a material), respectively; 175, 90 and 108 for $NO_x$, 25, 38 and 46 for $SO_2$, and 65, 36 and 12 for carbon monoxide and hydrocarbon (using iron carbonate as a material), respectively; 155, 54 and 77 for $NO_x$, 20, 34 and 43 for $SO_2$, and 55, 35 and 10 for carbon monoxide and hydrocarbon (using oxy basic ferric sulfate as a material), respectively; 138, 51 and 75 for $NO_x$, 15, 25 and 39 for $SO_2$, and 35, 20 and 0 for carbon monoxide and hydrocarbon (using basic manganese chloride as a material), respectively; 168, 73 and 90 for $NO_x$, 29, 36 and 46 for $SO_2$, and 53, 30 and 12 for carbon monoxide and hydrocarbon (using basic cobalt sulfate as a material), respectively; 263, 105 and 176 for $NO_x$, 25, 40 and 48 for $SO_2$, and 87, 52 and 220 for carbon monoxide and hydrocarbon (using polyaluminium ferric chloride as a material), respectively. The regeneration of the used purificant is the same with above examples.

Example 59

A preparation method of the purificant: add ammonium ferrous sulfate, ammonium cobalt chloride, ammonium manganese chloride, cuprous chloride, polyferric aluminum sulfate, potassium iron sulfate, and cupric tetramminosulfate ferrous to a mixing reactor with sodium hydroxide, calcium oxide and water at a ratio of about 1:1:3:6, respectively. Other operation procedures are the same with example 42, except that the activation temperature is 550° C. The final obtained product is one purificant of present invention.

Example 60

The reactor is the same as used in example 22. The purificants prepared in example 59 are adopted. Other operating conditions are the same as in example 22. When the inlet gas temperatures are 250° C., 350° C. and 450° C., the minimum gas outlet concentrations of pollutants are: 248, 73 and 83 for $NO_x$ (ppm, the same below), 22, 25 and 45 for $SO_2$ (ppm, the same below), and 55, 20 and 1 for carbon monoxide and hydrocarbon (mg/m$^3$, the same below) (using ammonium ferrous sulfate as a material), respectively; 265, 88 and 92 for $NO_x$, 25, 31 and 46 for $SO_2$, and 49, 21 and 1 for carbon monoxide and hydrocarbon (using ammonium cobalt chloride as a material), respectively; 191, 54 and 79 for $NO_x$, 23, 30 and 41 for $SO_2$, and 41, 15 and 0 for carbon monoxide and hydrocarbon (using ammonium manganese chloride as a material), respectively; 185, 52 and 78 for $NO_x$, 27, 35 and 45 for $SO_2$, and 35, 12 and 0 for carbon monoxide and hydrocarbon (using cuprous chloride as a material), respectively; 278, 161 and 155 for $NO_x$, 29, 37 and 47 for $SO_2$, and 65, 33 and 5 for carbon monoxide and hydrocarbon (using polyferric aluminum sulfate as a material), respectively; 258, 143 and 160 for $NO_x$, 29, 39 and 48 for $SO_2$, and 63, 35 and 7 for carbon monoxide and hydrocarbon (using potassium iron sulfate as a material), respectively; 191, 67 and 86 for $NO_x$, 25, 33 and 45 for $SO_2$, and 56, 25 and 0 for carbon monoxide and hydrocarbon (using cupric tetramminosulfate ferrous as a material), respectively. The regeneration of the used purificant is the same with in above examples.

It should be noted that the above embodiments are merely illustrative of the technical aspects of the present invention. It will be apparent to those skilled in the art that the technical solutions recited in the embodiments may be modified within the spirit and principles of the present invention, or any equivalent of any of the technical features therein may be replaced, modified, changed and improved, are to be included within the scope of the present invention.

The invention claimed is:

1. A noxious gas purificant for the removal of nitrogen oxides from a gas stream at a temperature ranging from 150 to 550° C., wherein the preparation method of the purificant comprises following steps:
   (1) mixing material U, material V according to stoichiometric reaction mole ratio and water in a mixing reactor, wherein said material U is at least one of the salts of sulfates and chlorides of component A, wherein component A is one of iron(II), iron(III), cobalt(II), manganese(II), copper(I), or copper(II) and said material V is (a) at least one of the hydroxides and carbonates of a component B, wherein component B is one of sodium, potassium and lithium, or (b) at least one of oxides, hydroxides and carbonates of a component F, wherein component F is one of calcium, barium and magnesium, or a combination of said (a) and (b); and
   (2) molding a reaction product of step (1) to a shape of honeycombs, plates, granules, or loading on a general-purpose catalyst carrier;
   (3) drying the reaction product at a temperature above 40° C.;
   (4) activating the reaction product at a temperature above 150° C. after step (3); and
   wherein the composition of the purificant comprises at least one component of the sulfates of sodium, potassium, lithium, calcium, barium and magnesium; or at least one component of the chlorides of sodium, potassium, lithium, calcium, barium and magnesium; or a combination of at least one of said sulfates or chlorides and the at least one of the carbonates of calcium, barium and magnesium.

2. A noxious gas purificant according to claim 1, wherein said material U is ferrous sulfate, and said material V is at least one of the hydroxides of said component B: sodium, potassium and lithium.

3. A noxious gas purificant according to claim 1, wherein said material U is ferrous sulfate, and said material V is a combination of at least one of the hydroxides of said component B: sodium, potassium and lithium, and at least one of the oxides and hydroxides of said component F: calcium, barium and magnesium.

4. A noxious gas purificant according to claim 1, wherein said material U is ferrous sulfate, and said material V is at least one of the oxides and hydroxides of said component F: calcium, barium and magnesium.

5. A noxious gas purificant according to claim 1, wherein said material U is ferrous chloride, and said material V is at least one of oxides and hydroxides of said component F: calcium, barium and magnesium.

6. A noxious gas purificant according to claim 1, wherein said material U is ferrous chloride, and said material V is at least one of the hydroxides of said component B: sodium, potassium and lithium; or said material V is a combination of at least one of the hydroxides of said component B: sodium, potassium and lithium, and at least one of the oxides or hydroxides of said component F: calcium, barium and magnesium.

7. A noxious gas purificant according to claim 1, wherein said material U is ferric chloride, and said material V is at least one of the hydroxides of said component B: sodium, potassium and lithium; or said material V is at least one of the oxides or hydroxides of said component F: calcium, barium and magnesium; or said material V is a combination of at least one of the hydroxides of said component B and at least one of the oxides or hydroxides of said component F.

8. A noxious gas purificant according to claim 1, wherein said material U is at least one of the salts of sulfates and chlorides of component P: cobalt(II), manganese(II), copper (I) or copper (II), and material V is at least one of the hydroxides of said component B: sodium, potassium and lithium; or said material V is at least one of oxides, hydroxides and carbonates of said component F: calcium, barium and magnesium; or said material V is a combination of at least one of the hydroxides of said component B and at least one of oxides, hydroxides and carbonates of said component F.

9. A noxious gas purificant according to claim 1, wherein said material U is a combination of at least one of the sulfates and chlorides of the component A: iron (II) or iron (III), and at least one of the salts of sulfates, chlorides and carbonates of component P: cobalt (II), manganese (II) and copper (I) or copper (II), and said material V is at least one of the hydroxides of said component B: sodium, potassium and lithium; or said material V is at least one of oxides and hydroxides and carbonates of said component F: calcium, barium and magnesium; or said material V is a combination of at least one of the hydroxides of said component B and at least one of oxides and hydroxides and carbonates of said component F.

* * * * *